US009948619B2

(12) United States Patent
Douglis et al.

(10) Patent No.: US 9,948,619 B2
(45) Date of Patent: *Apr. 17, 2018

(54) SYSTEM AND METHOD FOR ENCRYPTION KEY MANAGEMENT IN A MIXED INFRASTRUCTURE STREAM PROCESSING FRAMEWORK

(71) Applicant: INTERNATIONAL BUSINESS MACHINES CORPORATION, Armonk, NY (US)

(72) Inventors: Frederick Douglis, Basking Ridge, NJ (US); Zachary Garbow, Louisville, CO (US); Fan Ye, E. Setauket, NY (US)

(73) Assignee: International Business Machines Corporation, Armonk, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/947,917

(22) Filed: Nov. 20, 2015

(65) Prior Publication Data

US 2016/0119298 A1    Apr. 28, 2016

Related U.S. Application Data

(63) Continuation of application No. 11/971,322, filed on Jan. 9, 2008, now Pat. No. 9,219,603.

(51) Int. Cl.
| | |
|---|---|
| H04L 29/06 | (2006.01) |
| H04L 9/08 | (2006.01) |
| G06F 21/60 | (2013.01) |
| G06F 21/62 | (2013.01) |

(52) U.S. Cl.
CPC ........ *H04L 63/0457* (2013.01); *G06F 21/606* (2013.01); *G06F 21/6245* (2013.01); *H04L 9/083* (2013.01); *H04L 9/088* (2013.01); *H04L 9/0841* (2013.01); *H04L 9/0861* (2013.01)

(58) Field of Classification Search
CPC .... G06F 21/606; H04L 67/10; H04L 63/0457
See application file for complete search history.

(56) References Cited

U.S. PATENT DOCUMENTS

| | | | | |
|---|---|---|---|---|
| 2002/0087709 | A1* | 7/2002 | Kerr | H04L 29/06 709/231 |
| 2004/0044718 | A1* | 3/2004 | Ferstl | G06F 9/5044 709/200 |
| 2004/0091104 | A1* | 5/2004 | Kawamura | H04L 63/0457 380/28 |

(Continued)

*Primary Examiner* — Thaddeus Plecha
(74) *Attorney, Agent, or Firm* — Tutunjian & Bitetto, P.C.; Rabin Bhattacharya

(57) ABSTRACT

A system and method for protecting streams in a mixed infrastructure includes determining processing elements that are to access a data stream in a stream processing environment and determining a security level for each processing element. Keys are generated per stream per processing element in accordance with the security level. The keys are associated with processing elements in an access control list in a location accessible by producing and consuming processing elements. The stream is decrypted for processing using keys released upon authenticating processing elements in accordance with the access control list. At security boundaries, the stream is re-encrypted in accordance with a next processing element.

20 Claims, 2 Drawing Sheets

(56) References Cited

U.S. PATENT DOCUMENTS

| | | | |
|---|---|---|---|
| 2005/0169468 A1* | 8/2005 | Fahrny | H04N 7/1675 380/210 |
| 2008/0244268 A1* | 10/2008 | Durham | H04L 63/062 713/171 |
| 2016/0239672 A1* | 8/2016 | Khan | G06F 21/606 |

* cited by examiner

SYSTEM AND METHOD FOR ENCRYPTION KEY MANAGEMENT IN A MIXED INFRASTRUCTURE STREAM PROCESSING FRAMEWORK

CROSS REFERENCE TO RELATED APPLICATIONS

This application is a Continuation application of co-pending U.S. patent application Ser. No. 11/971,322, filed on Jan. 9, 2008, incorporated herein by reference in its entirety.

GOVERNMENT RIGHTS

This invention was made with Government support under Contract No.: H98230-07-C-0383 awarded by the Department of Defense (DOD). The Government has certain rights in this invention.

BACKGROUND

Technical Field

The present invention relates to protecting sensitive data in stream processing service environments (SPSEs), and more particularly to systems and methods for managing encryption keys and for stream data encryption.

Description of the Related Art

Systems for processing streams of data utilize continuous streams of data as inputs, process these data in accordance with prescribed processes and produce ongoing results. Examples of stream processing systems include System S from IBM®; StreamBase™ from StreamBase Systems™, Inc.; and Borealis™ from MIT and Brown University. In such a system, applications are composed of independent processing elements that operate on streams of data objects by filtering, combining, transforming, and otherwise analyzing the data. These operations can take the form of database operations such as merging streams and selecting tuples that match specific criteria, or they can be more general application-specific logic.

A stream processing system can be owned, operated, and used for the benefit of a single entity, such as a corporation or government organization. It can also be owned and operated as a service, in which one organization operates the system for the benefit of other organizations that pay for the use of the stream processing system.

A key characteristic of a stream processing service environment (SPSE) is the existence of data and/or processing belonging to multiple organizations. In a stream processing service environment, such as System S, data is streaming from one processing element to another in near real time. It is imperative to protect sensitive data, which may exist in the inquiry, the processing element, the streaming data itself, or the results. If the stream processing is handled solely in a single infrastructure (provider), there are many methods of protecting sensitive data fairly easily and securely, including using security labels. However, in a mixed infrastructure, i.e., one that uses stream processing components (processing elements, job planners, data sources) across multiple hosts or providers, the data becomes much more difficult to protect.

One method to protect sensitive data as it is transferred within a remote, potentially insecure, host is to use encryption. However, in a mixed infrastructure environment, encryption is not as simple as creating a single key and encrypting/decrypting the data just once. Since the data may be processed by processing elements on one host, then transferred to processing elements on another host, there must be a way to intelligently encrypt the data and provide the decryption keys to the appropriate processing elements without allowing access to the decryption key by processing elements not involved in the processing of the job.

SUMMARY

The present embodiments describe systems and methods for permitting different organizations (mixed infrastructure) to interoperate in the context of a plurality of stream processing service environments (SPSEs).

A system and method for protecting streams in a mixed infrastructure includes determining processing elements that are to access a data stream in a stream processing environment and determining a security level for each processing element. Keys are generated per stream per processing element in accordance with the security level. The keys are associated with processing elements in an access control list in a location accessible by producing and consuming processing elements. The stream is decrypted for processing using keys released upon authenticating processing elements in accordance with the access control list. At security boundaries, the stream is re-encrypted in accordance with a next processing element.

A system for protecting streams in a mixed infrastructure includes a plurality of processing elements distributed in a mixed infrastructure network where one or more processing elements are associated with a site. The infrastructure networks include a plurality of sites. A job manager is configured to determine processing elements needed to process a stream in accordance with a job plan and to determine a security level of each processing element in the job plan. A security manager is disposed at each site, and the security manager is configured to manage keys assigned to each processing node for the job plan, where the keys are generated per stream per processing element in accordance with the security level. A control access list is centrally disposed and accessible to producing and consuming processing elements such that keys for decrypting encrypted streams are released by the security manager upon authentication of the processing elements in the job plan.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
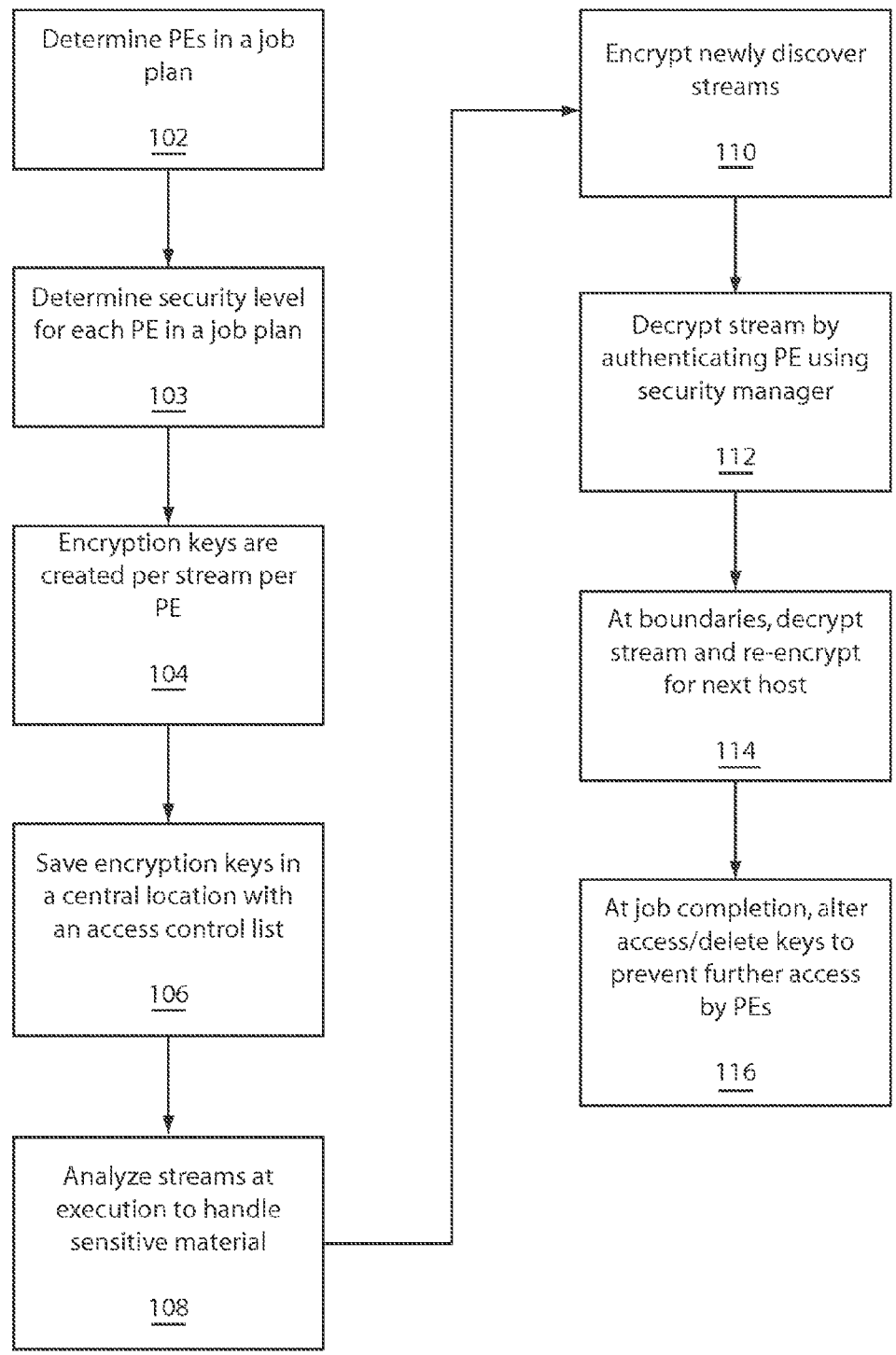
FIG. 1 is a block/flow diagram showing a system/method for stream data protection in accordance with one illustrative embodiment.

The present embodiments describe systems and methods for permitting different organizations to interoperate in the context of a plurality of stream processing service environments (SPSEs). In one embodiment, a SPSE can provide data and applications to a customer, wherein all data originates outside the customer's environment and is processed outside that environment. Thus, such data are not proprietary to the customer but are instead shared by the SPSE through some (contractual) arrangement. In another embodiment, data can originate in the customer's environment and be transmitted to the SPSE for processing by applications provided by the SPSE. Data that result from this processing are then transmitted back to the customer environment.

In another embodiment, proprietary applications from the customer's environment are made available to the SPSE to execute upon data, either from the customer or the SPSE. In the cases of proprietary data and/or processing, the SPSE ensures the security and integrity of the customer's property despite the possibility of other processing being performed on behalf of yet another party. Under appropriate circumstances, not all data or processing need be kept secret from other users of the same SPSE. To the contrary, a SPSE can support "third-party" data and applications: one customer can arrange to access the data or applications provided by either another customer or some other organization, as long as the policies governing access to the data or applications permit such activity.

Another embodiment provides the ability for a customer of a SPSE to obtain data and/or applications from the SPSE, and then performs stream processing operations within its own execution environment rather than in the SPSE. The customer can execute applications belonging to the SPSE or to third parties that make the applications available through the SPSE. Similarly, the customer can ingest data from the SPSE that may belong to the SPSE itself or to a third party. There can be economic incentives for getting a third party to make data or applications available, though such incentives are not a requirement.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Depending on the nature of the data and the organization's local infrastructure, it may be desirable to send sensitive data to a service provider, as long as it is properly handled. The present embodiments manage the encryption of data streams in a mixed infrastructure, i.e., one that uses stream processing components (processing elements, job planners, data sources) across multiple hosts or providers, in a stream processing environment. In such an environment, data streams may be encrypted using different keys via symmetric encryption, depending upon which host and processing elements (PEs) will be accessing the stream.

In accordance with the present principles, the following challenges have been addressed in encrypting data streams in a SPSE: 1) How to determine when to encrypt a stream and which key should be used to do so. 2) How to safely manage the encryption and decryption keys. 3) How to permit those processing elements (PEs) with a need to encrypt/decrypt access to the appropriate keys. 4) How to transfer data across different sites.

The present embodiments solve these challenges using, e.g., security managers which generate, distribute, and control access to keys for encrypting and decrypting data within a SPSE. Referring now to the drawings in which like numerals represent the same or similar elements and initially to FIG. 1, a system/method of encrypting sensitive data in a mixed infrastructure stream processing framework is illustratively depicted such that only the processing elements that are needed to process a stream according to the job plan are permitted access to decryption keys. Additionally, in accordance with the present principles a security manager mechanism is provided for intelligently generating session-based keys for encryption/decryption and utilizing these keys to provide encryption as the stream travels between host boundaries.

In block 102, prior to a job plan being executed, a job manager determines which PEs will be involved, on which hosts, and, in block 103, a security level of each host/PE. If a stream is deemed sensitive in accordance with any policy, an encryption key is created for each host that will be accessing the stream. The encryption key may be issued in accordance with a security level. In block 104, encryption keys are created on a per stream, per PE instance, not just per host (since one host can run multiple PEs). The encryption keys may be generated by a job manager or a security manager.

In block 106, each encryption key is then saved in a central location within the system with an access control list set to allow access to keys only to the PEs in the plan that analyze the data stream. Both the producing and consuming PE need to access the encryption key. The central location would be accessible from both of them. The central location may be a designated location or may be with the security manager or the job manager.

In block 108, during execution, streams are further analyzed on-the-fly to discover sensitive data streams that were not predicted in advance (e.g., in block 102), and creation/distribution of keys is handled similarly as in block 102. In block 110, streams flagged as sensitive are subsequently routed through an encryption PE, which encrypts the stream with the appropriate key before streaming the stream to a next PE in the job plan.

In block 112, to decrypt a secure stream, a PE requests the key from the security manager. The security manager compares the PE ID (identification) to the job plan to determine whether to accept/reject the request. A more secure method may include the security manager inserting authentication keys in the PEs, and these PEs then employ challenge/response methods to authenticate themselves to security manager to access encryption/decryption keys.

A PE requesting a key is authenticated using authentication techniques known in the art, such as, e.g., those employed in secure server access systems.

In block 114, when a stream reaches a security boundary, e.g., a boundary of a host (e.g., where the next processing will occur by a PE on another distributed host), the stream is handled by a special PE which decrypts the stream using the appropriate key for the current host, then encrypts it with the key associated with the subsequent host. This prevents separate hosts from accessing each others' keys. The security boundary may include a host boundary, or any location where a security level or classification of data changes between processing elements. While a special PE is described and depicted, any PE perform the encryption and send an encrypted stream to another host, as long as 1) the PE can authenticate itself to security manager to obtain an encryption key, and 2) its consumer PEs can authenticate themselves to the security manager to obtain the same key for decryption.

In block 116, once the job is complete, the access control for the encryption key is adjusted so that no PEs can access the encryption key, or the encryption key is deleted.

Figure 2:
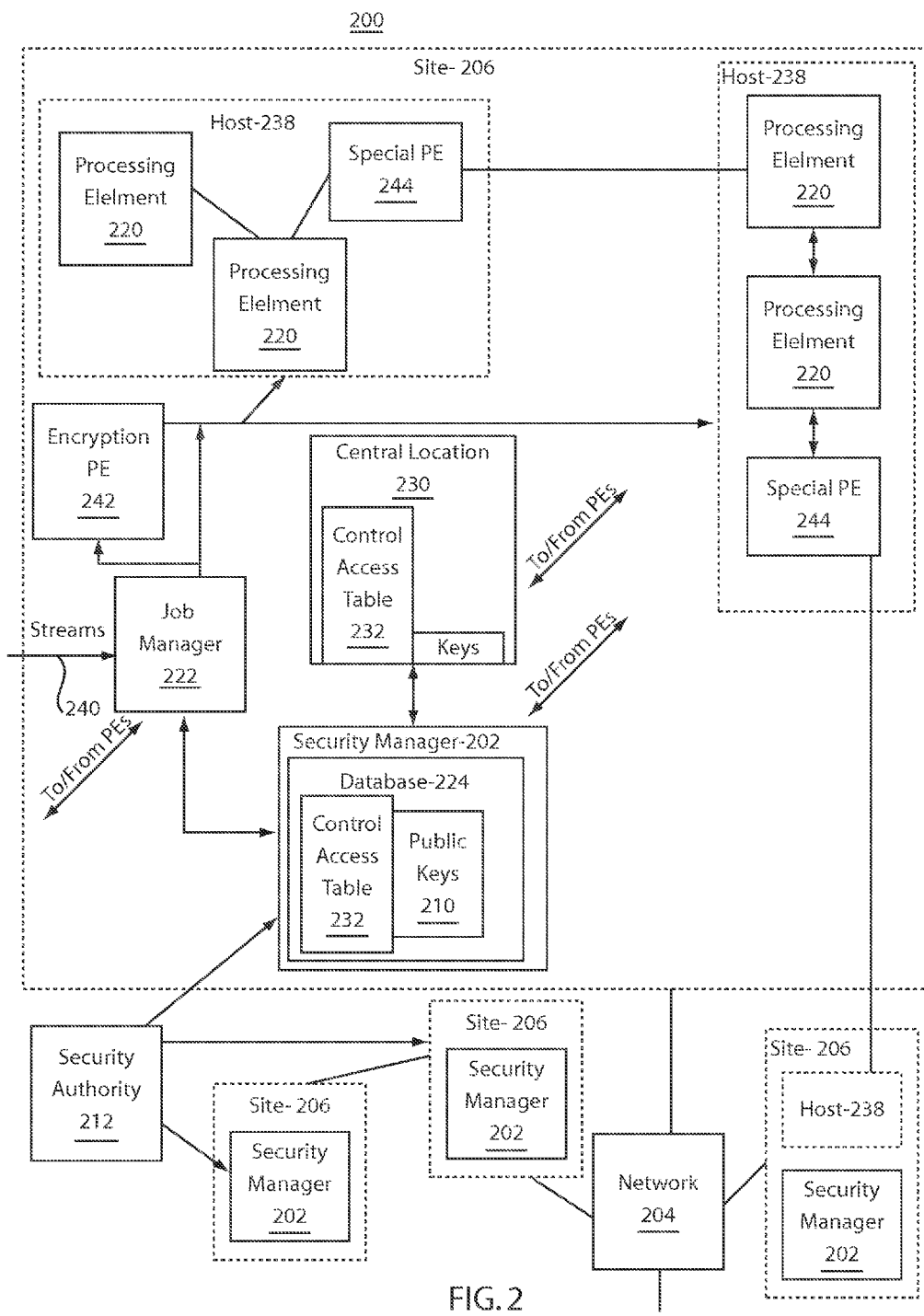
FIG. 2 is a block diagram illustratively showing an exemplary network and one site in detail to demonstrate the present principles.

Referring to FIG. 2, a block/flow diagram shows a mixed infrastructure 200 in accordance with one illustrative embodiment. The infrastructure 200 may include a plurality of sites 206, which may be privately owned resources or publicly accessible resources. Infrastructure 200 may include one or more networks 204 or any other elements in a stream processing environment.

Each use case covered in accordance with the present principles uses a similar framework utilizing one or more security managers 202. Each site 206 in a SPSE includes a security manager 202, and security managers on different sites can establish shared keys using their public keys 210 (e.g. Diffie-Hellman). Further, security managers 202 on different sites may be subject to external security authorities 212 such as Certificate Authority (CA) or Key Distribution Centers (KDC).

Security managers 202 serve as a secure component within each site 206 of a SPSE. Before a processing element (PE) 220 is deployed, a job manager 222 obtains a secret key on behalf of that PE 220 from the security manager 202. The job manager 222 then configures the PE 220 with the secret key before deploying the PE. The PE ID and secret key are saved within a secure database or lookup table 224 preferably maintained by the security manager 202 on the site 206 (or at a central location 230 or at the job manager 222) in which the PE 220 is to be hosted. The PE 220 can subsequently use the secret key to authenticate itself to the security manager 202 and gain access to the appropriate encryption/decryption keys. Herein the secret keys are referred to as authentication keys.

Prior to a job being executed, the job manager 222 determines which PEs will be involved, on which hosts, and the security level of each host/PE. The security level is determined based on existing security constraints or manual configuration. In another embodiment, the security level can be based on keyword analysis of the streaming data, who owns the host, what PEs are running on that host or other considerations.

If a stream is deemed sensitive, an encryption key is created for each PE 220 that will be accessing the stream. Encryption keys are created on a per-stream, per-PE instance, not just per-host, since one host 238 can run multiple PEs.

Each encryption key is then saved in a central location 230 by the security manager 202 within the system with an access control list 232 set to allow access to keys only to the PEs in the plan that analyze the data stream. The central location may be at the security manager, job manager or other position. The access control list 232 may be distributed between one or more entities. Both the producing and consuming PEs need to access the encryption key. The central location 230 would be accessible from both of them via requests to the security manager 202. The security manager 202 authenticates the requesting processing element, and if the processing element is part of the job plan for the requested stream, provides the appropriate encryption/decryption key.

For inter-site job plans job managers 222 of the involved sites are notified of an inter-site job plan. The job managers 222 notify the security managers 202 of the inter-site job plan, and the security managers 202 establish cross-site session keys for inter-site data encryption.

During execution, streams 240 are further analyzed on the fly, e.g., by a special PE or any PE to analyze the stream for sensitivity, to discover sensitive data streams that were not predicted in advance, and creation/distribution of keys is handled similarly. Streams flagged as sensitive are subsequently routed through an encryption PE 242, which encrypts the stream with the appropriate key before streaming it to the next PE in the plan. To decrypt a secure stream, a PE requests the key from the security manager 202. The security manager 202 compares the PE ID and/or the PEs pre-configured key for authentication to the job plan to determine whether to accept/reject the request. A PE requesting a key may be authenticated using authentication techniques known in the art.

When a stream reaches a security boundary, e.g., the boundary of a host, the stream is handled by a special PE 244 which decrypts the stream using the appropriate key for the current host, then encrypts it with the key associated with the subsequent host. Alternately, PEs may migrate among hosts. A key may be associated with a producing PE, and consuming PEs on another host can access the key from the security manager for decryption. Thus, there is no need in this embodiment to change the key for migrating consuming PEs.

Once the job is complete, the access control for the encryption key is adjusted so that no PEs can access the encryption key, or the encryption key is deleted.

In accordance with one illustrative embodiment, five levels of protection for data in transit are provided. It should be noted that the five levels are illustrative to demonstrate functions and mechanisms provided in accordance with the present principles. A greater number of fewer number of security levels are also contemplated. In this illustration the five security levels include: 1) No encryption at all, 2) site-to-site encryption, 3) per-stream site-to-site encryption, 4) per-stream intra-site encryption, 5) long-term encryption for persisted stream data. Methods for handling each of these levels are described herein.

The illustrative example handles various levels of intra- and inter-site security using the aforementioned framework. These are described as follows:

Level 1—No encryption at all. In this case, no encryption is needed and streams flow as normal.

Level 2—Site-to-site encryption. In the case of site-to-site encryption, all streams from one site are encrypted before sending the streams to another site. The security managers on the two sites establish shared session keys. These session keys are used to encrypt and decrypt all traffic between the two sites. Gateway PEs on the two sites are used for encryption/decryption of all traffic flowing between the sites. Periodically, the session keys may be changed by the security manager. When this occurs, the security managers instruct the gateway PEs to use the newly created session keys. In the case of site-to-site encryption, the PEs use pre-configured authentication keys to authenticate themselves to the security manager to receive the session keys.

Level 3—Per stream site-to-site encryption. This case is similar to site-to-site encryption; however, each stream may have its own session key. As such, this case is more distributed, in the sense that streams cannot be wholly encrypted/decrypted, but instead are handled on a stream-by-stream basis. Before a distributed job is deployed, the REC (Remote Execution Coordinator, which is the driver component for running a distributed job) of the owner site examines which cross-site streams exist and which PEs are consuming/producing that stream. For each stream, the REC notifies the respective job managers on each site. The job managers then request the security managers on each site to establish shared session keys. The job managers then configure the appropriate PEs with the created session key. The job manager also configures each such PE with an authentication key from the security manager.

Session keys are subsequently used to encrypt the stream of data between the two sites. The job managers notify the two gateway PEs on the respective sites of the session key used to encrypt/decrypt the stream. The PEs then request this key from the security manager, which authenticates the PE and accepts or denies the request based on whether the requesting PE in fact needs the session key (based on the job plan delivered to the security manager by the job manager). Similar to site-to-site encryption, session keys are changed periodically by the security manager.

Level 4—Per-stream intra-site host-to-host. This case is similar to that of the per-stream site-to-site encryption, although only a single security manager is utilized.

Level 5—Encryption for persisted data. For a job that writes persisted streams to storage, the job manager obtains an encryption key from the security manager. The job manager then configures a sink PE with the key, which the sink PE uses to write the stream to persisted storage. The security manager associates this key with the persisted stream.

For a job to access the persisted stream, the job manager obtains the encryption key from the security manager and uses the key to configure the source PE. The source PE then reads the persisted stream using the encryption key to decrypt it.

If changing the key is needed (in the case of a compromised key, for example), the security manager creates a new key. The storage manager then reads and decrypts the persisted stream with the old key and encrypts it again with the new key.

Having described preferred embodiments of a system and method for encryption key management in a mixed infrastructure stream processing framework (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for protecting streams in a mixed infrastructure, comprising:
   determining a plurality of processing elements that are to access a data stream in a job plan;
   determining a security level for each of the processing elements;
   generating, in response to the determining the plurality of processing elements, different keys per stream per processing element for each of the processing elements in accordance with the security level; and
   at security boundaries, re-encrypting the stream in accordance with a next processing element of the plurality of processing elements.

2. The method as recited in claim 1, wherein determining a security level includes selecting one of a plurality of security levels for each processing element.

3. The method as recited in claim 1, wherein the security level includes one of site to site encryption, per stream site to site encryption, per stream intra-site encryption and long-term encryption for persisted streams.

4. The method as recited in claim 1, wherein the mixed infrastructure includes sites and each site includes a security manager, the method further comprising establishing shared keys between security managers at different sites to manage security between the sites.

5. The method as recited in claim 1, further comprising analyzing streams during execution to determine sensitivity of the streams.

6. The method as recited in claim 1, further comprising:
   associating the keys with the respective processing elements in an access control list in a location accessible by producing and consuming processing elements of the plurality of processing elements;
   decrypting the stream using the keys, which are released to the respective processing elements upon authenticating the plurality of processing elements using the access control list; and
   wherein re-encrypting the stream in accordance with a next processing element includes decrypting the stream using a key associated with a current host of the stream and re-encrypting the stream using a key associated with a next host.

7. The method as recited in claim 6, further comprising adjusting access to keys at completion of a job to prevent further access by processing elements.

8. The method as recited in claim 5, further comprising, if the streams are deemed sensitive, encrypting the streams in accordance with a next processing element in a job plan.

9. The method as recited in claim 1, further comprising:
   notifying job managers on different sites of an inter-site job plan; and
   notifying security managers of the inter-site job plan to establish cross-site session keys for inter-site data encryption.

10. A non-transitory computer readable medium comprising a computer readable program for protecting streams in a mixed infrastructure, wherein the computer readable program when executed on a computer causes the computer to perform the steps of:
- determining a plurality of processing elements that are to access a data stream in a job plan;
- determining a security level for each of the processing elements;
- generating, in response to the determining the plurality of processing elements, different keys per stream per processing element for each of the processing elements in accordance with the security level; and
- at security boundaries, re-encrypting the stream in accordance with a next processing element of the plurality of processing elements.

11. The non-transitory computer readable medium as recited in claim 10, wherein determining a security level includes selecting one of a plurality of security levels for each processing element wherein the security levels include one of site to site encryption, per stream site to site encryption, per stream intra-site encryption and long-term encryption for persisted streams.

12. The non-transitory computer readable medium as recited in claim 10, further comprising analyzing streams during execution to determine sensitivity of the streams.

13. The non-transitory computer readable medium as recited in claim 10, further comprising:
- associating the keys with the respective processing elements in an access control list in a location accessible by producing and consuming processing elements of the plurality of processing elements;
- decrypting the stream using the keys, which are released to the respective processing elements upon authenticating the plurality of processing elements using the access control list; and
- wherein re-encrypting the stream in accordance with a next processing element includes decrypting the stream using a key associated with a current host of the stream and re-encrypting the stream using a key associated with a next host.

14. The non-transitory computer readable medium as recited in claim 13, further comprising adjusting access to keys at completion of a job to prevent further access by processing elements.

15. The non-transitory computer readable medium as recited in claim 12, further comprising, if the streams are deemed sensitive, encrypting the streams in accordance with a next processing element in a job plan.

16. A system for protecting streams in a mixed infrastructure, comprising:
- a plurality of processing elements distributed in a mixed infrastructure network where one or more processing elements are associated with a site, the infrastructure network including a plurality of sites, wherein at least one of the processing elements includes a hardware processor;
- a job manager configured to determine processing elements needed to process a stream in accordance with a job plan and to determine a security level of each processing element in the job plan;
- a security manager disposed at each site, the security manager configured to manage keys assigned to each processing node for the job plan, where the keys are generated per stream per processing element in accordance with the security level; and
- a special processing element configured to re-encrypt the stream in accordance with a next processing element of the plurality of processing elements at security boundaries.

17. The system as recited in claim 16, wherein the special processing element is further configured to decrypt a stream in accordance with a key associated with a current host.

18. The system as recited in claim 16, wherein the security level includes one of site to site encryption, per stream site to site encryption, per stream intra-site encryption and long-term encryption for persisted streams.

19. The system as recited in claim 16, wherein the job manager is configured to analyze streams during execution to determine sensitivity of the streams.

20. The system as recited in claim 19, further comprising an encryption processing element configured to encrypt the streams in accordance with a next processing element in the job plan, if the streams were deemed sensitive by the job manager.

* * * * *